(12) United States Patent
Kang et al.

(10) Patent No.: US 11,778,485 B2
(45) Date of Patent: *Oct. 3, 2023

(54) REPEATER AND METHOD OF OPERATION THEREOF

(71) Applicant: SOLiD, INC., Seongnam-si (KR)

(72) Inventors: Sangwook Kang, Seoul (KR); Hoony Hong, Seoul (KR); Hyunchae Kim, Seoul (KR); Kwon Kim, Seoul (KR); Woosik Moon, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,557

(22) Filed: Mar. 11, 2022

(65) Prior Publication Data

US 2022/0201501 A1 Jun. 23, 2022

Related U.S. Application Data

(63) Continuation of application No. 16/652,912, filed as application No. PCT/KR2019/009118 on Jul. 23, 2019, now Pat. No. 11,297,514.

(30) Foreign Application Priority Data

Jul. 23, 2018 (KR) .......................... 10-2018-0085616

(51) Int. Cl.
*H04W 16/26* (2009.01)
*H04B 7/155* (2006.01)
*H04L 5/14* (2006.01)
*H04W 56/00* (2009.01)

(52) U.S. Cl.
CPC ............ *H04W 16/26* (2013.01); *H04B 7/155* (2013.01); *H04L 5/1469* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 11,297,514 B2* | 4/2022 | Kang | H04L 5/1469 |
| 2016/0360500 A1* | 12/2016 | Kim | H04B 7/04 |
| 2018/0013483 A1* | 1/2018 | Liang | H04B 7/0617 |
| 2018/0176003 A1* | 6/2018 | Hayes | H04B 7/0848 |
| 2019/0028187 A1* | 1/2019 | Gutman | H04W 52/24 |
| 2020/0021421 A1* | 1/2020 | Han | H04W 52/367 |

FOREIGN PATENT DOCUMENTS

WO WO-2016161438 A1 * 10/2016 ............ H04W 56/00

* cited by examiner

*Primary Examiner* — Anh Vu H Ly
(74) *Attorney, Agent, or Firm* — Sughrue Mion, PLLC

(57) ABSTRACT

A method of operating a repeater comprises detecting a synchronization signal from a received communication signal, identifying a time division duplex (TDD) switching pattern based on a power change of the communication signal over time and switching an uplink operation and a downlink operation of the repeater based on the detected synchronization signal and the TDD switching pattern.

10 Claims, 6 Drawing Sheets

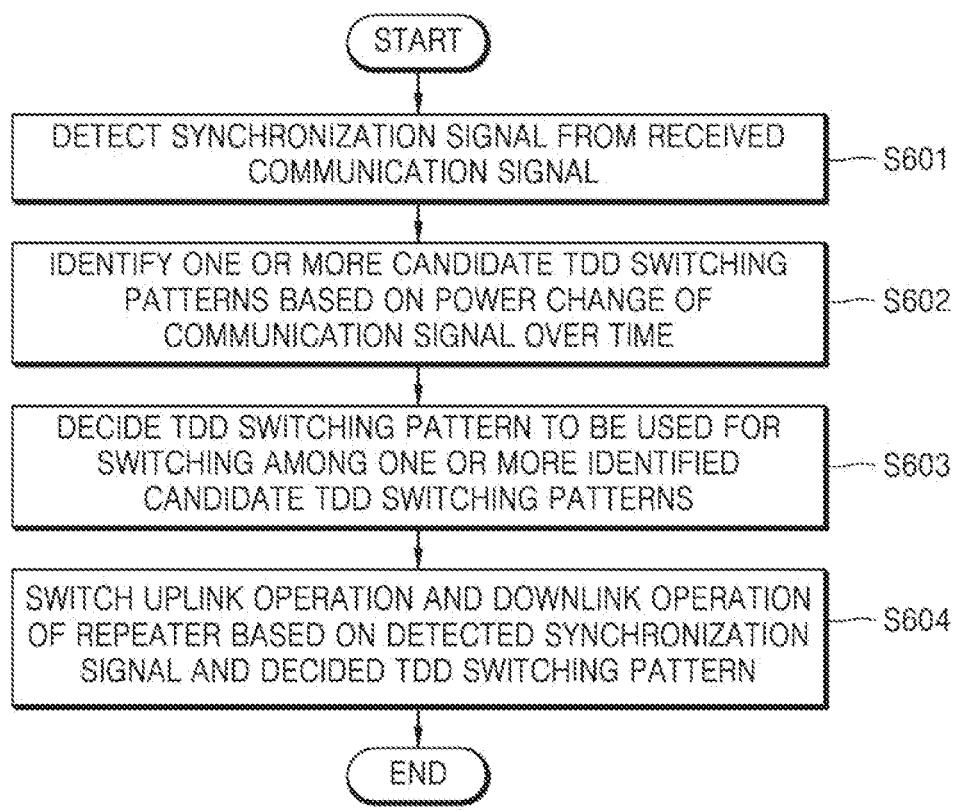

REPEATER AND METHOD OF OPERATION THEREOF

CROSS REFERENCE TO RELATED APPLICATIONS

This application is a continuation of U.S. application Ser. No. 16/652,912 filed Apr. 1, 2020, which is a National Stage of International Application No. PCT/KR2019/009118 filed Jul. 23, 2019, claiming priority based on Korean Patent Application No. 10-2018-0085616 filed Jul. 23, 2018.

TECHNICAL FIELD

The present disclosure relates to a repeater and a method of operating the same, and more particularly, to a repeater capable of switching an uplink operation and a downlink operation based on an switching pattern identified according to a power change of a synchronization signal and a communication signal over time, and a method of operating the repeater.

BACKGROUND ART 5G new radio (NR) is defined as Release 15, the standard specification of 3rd generation partnership project (3GPP) as a wireless interface in 5G communication, and a frame structure is defined according to a 3GPP standard document (standard number TS 38 Series).

A time division duplex (TDD) operation of the 5G NR is different from a TDD operation of 4G long-term evolution (LTE). A TDD of the 5G NR may operate as a dynamic TDD as well as a static TDD in which the time allocation of uplink and downlink communications does not change.

A relay system (e.g., repeaters, distributed antenna systems, etc.) supporting the 5G NR receives a 5G NR base station signal to solve a radio shadow area of a radio access network using the 5G NR.

In the 5G NR relay system supporting a TDD communication service, it is necessary to separately amplify communication signals of a downlink communication section and an uplink communication section in order to maintain good quality of amplified signals (e.g., a signal to noise ratio (SNR)). For this purpose, information of the uplink communication section and the downlink communication section divided in the time domain is important.

However, in order to obtain TDD switching information in the 5G NR relay system, there is a problem that complex demodulation and decoding should be performed based on a standard specification.

DESCRIPTION OF EMBODIMENTS

Technical Problem

Provided are a repeater capable of switching an uplink operation and a downlink operation based on an switching pattern identified according to a power change of a synchronization signal and a communication signal over time, and a method of operating the repeater.

Solution to Problem

According to an aspect of an embodiments, a method of operating a repeater may comprise detecting a synchronization signal from a received communication signal; identifying a time division duplex (TDD) switching pattern based on a power change of the communication signal over time; and switching an uplink operation and a downlink operation of the repeater based on the detected synchronization signal and the TDD switching pattern.

According to an aspect of an embodiments, the method may further comprise detecting a frame boundary in the communication signal based on the detected synchronization signal.

According to an aspect of an embodiments, the identifying of the TDD switching pattern may comprise identifying the TDD switching pattern on the basis of the power change of the communication signal over time, based on the detected frame boundary.

According to an aspect of an embodiments, the synchronization signal may be a primary synchronization signal (PSS), a secondary synchronization signal (SSS), a synchronization signal (SS)/physical broadcast channel (PBCH), or a demodulation reference signal (DMRS).

According to an aspect of an embodiment, the identifying of the TDD switching pattern may comprise detecting a period of the TDD switching pattern and a downlink communication section of the TDD switching pattern based on the power change of the communication signal over time.

According to an aspect of an embodiment, the identifying of the TDD switching pattern may comprise detecting the period of the TDD switching pattern using an uplink-downlink transition gap in the communication signal.

According to an aspect of an embodiments, the identifying of the TDD switching pattern may comprise identifying the TDD switching pattern when the sum of the uplink-downlink transition gap and a downlink-uplink transition candidate section corresponds to a length of a symbol corresponding to a size of a guard period or an integer multiple of the length of the symbol.

According to an aspect of an embodiments, the identifying of the TDD switching pattern may comprise identifying the TDD switching pattern using a preset uplink-downlink ratio.

According to an aspect of an embodiments, the identifying of the TDD switching pattern may comprise identifying one or more candidate TDD switching patterns corresponding to the communication signal based on a period of the TDD switching pattern.

According to an aspect of an embodiments, the method may further comprise deciding one candidate TDD switching pattern among the one or more candidate TDD switching patterns as a TDD switching pattern to be used for TDD switching.

According to an aspect of an embodiments, the deciding of the TDD switching pattern to be used for the TDD switching may comprise deciding the longest downlink communication section, among a plurality of downlink communication sections of the one or more identified candidate TDD switching patterns, as a downlink communication section of the TDD switching pattern.

According to an aspect of an embodiments, the deciding of the TDD switching pattern to be used for the TDD switching may further comprise verifying the decided TDD switching pattern according to whether a signal exists in a certain section outside the boundary of a section determined as a downlink communication section in the communication signal, based on the decided TDD switching pattern.

According to an aspect of an embodiments, the deciding of the TDD switching pattern to be used for the TDD switching may further comprise when determining that there is an error in the TDD switching pattern according to a result of the verification, verifying the TDD switching pattern by enhancing verification conditions including at least one of a period of a TDD switching pattern to be verified, a length of a downlink communication section to be verified, whether data is loaded, and a rate at which the decided TDD switching pattern matches a pattern of the communication signal.

According to an aspect of an embodiments, the method may further comprise relaxing the verification conditions when the verification conditions are satisfied for a reference time, as a result of verifying the TDD switching pattern by enhancing the one or more verification conditions.

According to an aspect of an embodiments, a repeater may comprise a sync detector configured to detect a sync signal from a received communication signal; a TDD pattern identifier configured to identify a time division duplex (TDD) switching pattern based on a power change of the communication signal over time; and a switching signal generator configured to generate a switching signal for switching an uplink operation and a downlink operation of the repeater based on the detected synchronization signal and the TDD switching pattern.

Advantageous Effects of Disclosure

A method and a device according to an embodiment of the present disclosure, by using an switching pattern identified according to a power change over time of a synchronization signal and a communication signal for switching, may perform TDD switching without separate complex demodulation and decoding based on a standard specification.

BRIEF DESCRIPTION OF DRAWINGS

The above and other aspects, features, and advantages of certain embodiments of the present disclosure will be more apparent from the following description taken in conjunction with the accompanying drawings, in which:

FIG. 6 is a flowchart of a method of operating a repeater according to an embodiment.

BEST MODE

Figure 1:
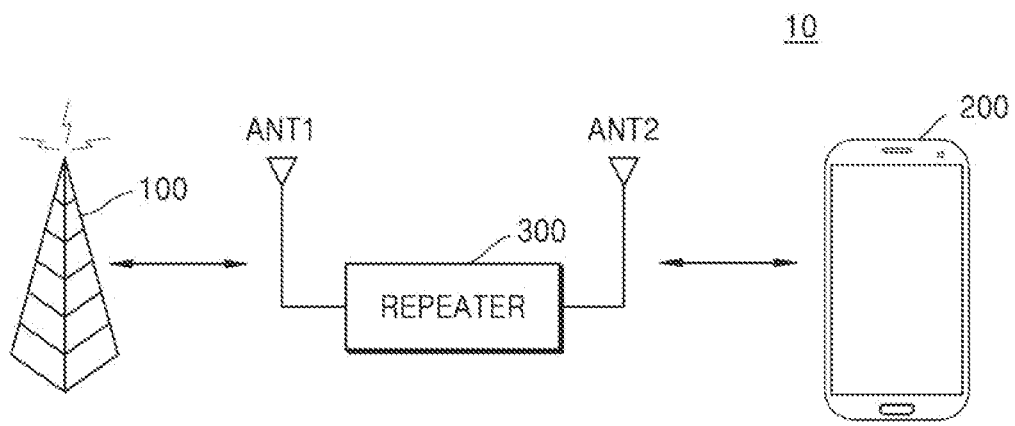
FIG. 1 is a conceptual diagram of a communication system according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the present disclosure.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

FIG. 1 is a conceptual diagram of a communication system according to an embodiment.

Referring to FIG. 1, a communication system 10 according to an embodiment may include a base station 100, a wireless communication terminal 200, and a repeater 300.

The repeater 300 may relay communication between the base station 100 and the wireless communication terminal 200.

According to an embodiment, the repeater 300 may relay a communication signal in a communication network composed of a 2G mobile communication network such as a global system for mobile communication (GSM) or code division multiple access (CDMA), a 3G mobile communication network such as wideband code division multiple access (WCDMA) or CDMA2000, a 3.5G mobile network such as high speed downlink packet access (HSDPA) or high speed uplink packet access (HSUPA), a 4G mobile network such as long term evolution (LTE) or LTE-Advanced, a 5G mobile network, a cloud radio access network (C-RAN), or a combination thereof.

The repeater 300 may receive a communication signal (e.g., a base station signal) received from the base station 100 through a first antenna ANT1 and may relay the received communication signal (e.g., the base station signal) to the wireless communication terminal 200 through a second antenna ANT2.

According to an embodiment, the communication signal may be a wireless communication signal (e.g., a radio frequency (RF) signal).

According to an embodiment, the communication signal may be a communication signal according to a 5G-new radio (5G-NR) standard, but is not limited thereto.

The first antenna ANT1 may be referred to as a donor antenna and the second antenna ANT2 may be referred to as a service antenna or a coverage antenna, but are not limited thereto.

According to an embodiment, the repeater 300 may be implemented as a repeater for relaying a wireless communication signal such as an RF repeater or an interference cancellation system (ICS) repeater.

In FIG. 1, for convenience of description, the repeater 300 relays communication between one base station 100 and one wireless communication terminal 200, but may also relay communication between a plurality of base stations and a plurality of wireless communication terminals. According to another embodiment, the repeater 300 may relay communication between the base station 100 and another repeater (not shown).

Detailed structure and operation of the repeater 300 will be described in detail with reference to FIG. 2.

Figure 2:
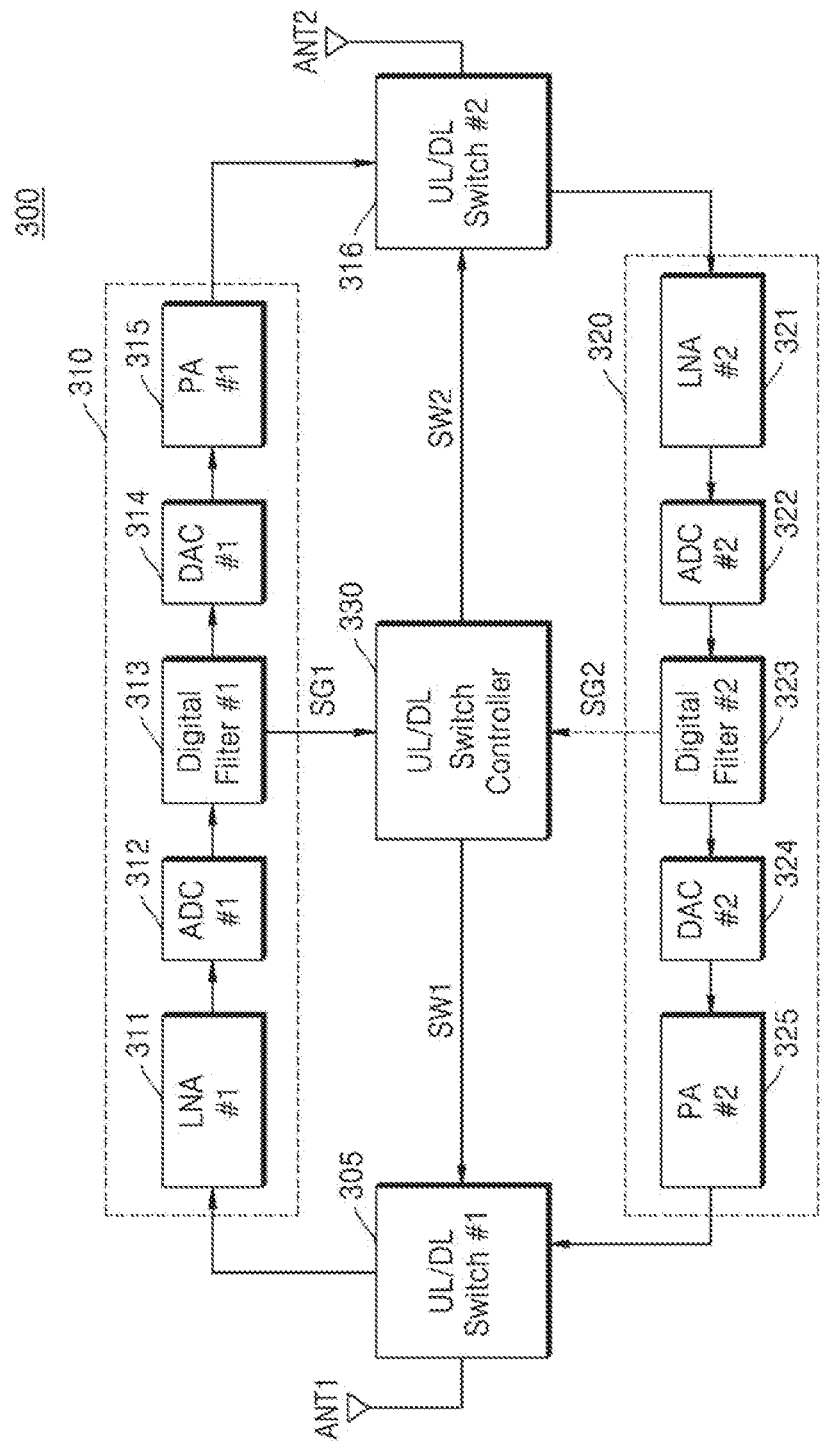
FIG. 2 is a block diagram according to an embodiment of a repeater shown in FIG. 1.

FIG. 2 is a block diagram according to an embodiment of the repeater 300 shown in FIG. 1.

Referring to FIGS. 1 and 2, the repeater 300 may include a first uplink/downlink (UL/DL) switch 305, a downlink processing circuit 310, a second uplink/downlink switch 316, an uplink processing circuit 320, and an uplink/downlink switch controller 330.

The first uplink/downlink switch 305 may switch a moving path of a communication signal in the repeater 300 in uplink communication and downlink communication, that is, an uplink operation and a downlink operation of the repeater 300.

In downlink communication, the first uplink/downlink switch 305 may receive a communication signal received through the first antenna ANT1 and may switch a moving path of a communication signal to transmit the received communication signal to the downlink processing circuit 310.

In uplink communication, the first uplink/downlink switch 305 may receive a communication signal received through the uplink processing circuit 320 and may switch a moving path of a communication signal to transmit the received communication signal to the first antenna ANT1.

According to an embodiment, the first uplink/downlink switch 305 may remove noise of the communication signal received through the first antenna ANT1 in downlink communication, and may output the noise-removed communication signal by frequency down-conversion.

According to an embodiment, the first uplink/downlink switch 305 may transmit the communication signal received through the uplink processing circuit 320 in uplink communication to the base station 100 through the first antenna ANT1.

According to an embodiment, the first uplink/downlink switch 305 may linearize and output the communication signal received through the uplink processing circuit 320 in uplink communication.

The first uplink/downlink switch 305 may switch a moving path of a communication signal according to a first switching signal SW1 generated by the uplink/downlink switch controller 330.

The downlink processing circuit 310 may include a first low-noise amplifier (LNA) 311, a first analog-to-digital converter (ADC) 312, a first digital filter 313, a first digital-to-analog converter (DAC) 314, and a first power amplifier (PA) 315.

The first low-noise amplifier 311 may amplify and output the communication signal received from the first uplink/downlink switch 305 to satisfy the minimum noise figure.

The first analog-to-digital converter 312 may digitally convert the communication signal that is amplified and output by the first low-noise amplifier 311 and may output the digitally converted communication signal.

The first digital filter 313 may filter an interference signal included in the digitally converted communication signal and output only a signal of a bandwidth.

According to an embodiment, the first digital filter 313 may be implemented as a part of a digital signal processor (not shown).

According to an embodiment, the first digital filter 313 may perform a digital filtering function and a digital signal processing function of a digitally filtered communication signal. In this case, a first communication signal SG1 may be output from the first digital filter 313 while being digitally filtered before digital signal processing.

Parameters of the first digital filter 313 (e.g., the type of filter (LPF, BPF, HPF, BSF, etc.), the center frequency of the filter, a passband of the filter, etc.) may be adjusted or set by a user, or may be adaptively adjusted according to characteristics of a communication signal.

According to an embodiment, the first digital filter 313 may be implemented including a bandpass filter.

The first communication signal SG1 filtered by the first digital filter 313 may also be output to the uplink/downlink switch controller 330.

The first digital-to-analog converter 314 may convert a digital communication signal filtered by the first digital filter 313 into an analog communication signal and output the analog communication signal.

The first power amplifier 315 may amplify the analog communication signal output by the first digital-to-analog converter 314 and may output the amplified analog communication signal.

The analog communication signal amplified and output by the first power amplifier 315 is transmitted to the second uplink/downlink switch 316.

The second uplink/downlink switch 316 may switch a moving path of a communication signal in the repeater 300 in uplink communication and downlink communication, that is, an uplink operation and a downlink operation of the repeater 300.

In downlink communication, the second uplink/downlink switch 316 may receive the communication signal received through the downlink processing circuit 310 and may switch a moving path of a communication signal to transmit the received communication signal to the second antenna ANT2.

In uplink communication, the second uplink/downlink switch 316 may receive a communication signal received through the second antenna ANT2 and may switch a moving path of a communication signal to transmit the received communication signal to the uplink processing circuit 320.

According to an embodiment, the second uplink/downlink switch 316 may transmit the communication signal received through the downlink processing circuit 310 in downlink communication to the base station 100 through the second antenna ANT2.

According to an embodiment, the second uplink/downlink switch 316 may linearize and output the communication signal received through the downlink processing circuit 310 in downlink communication.

According to an embodiment, the second uplink/downlink switch 316 may remove noise of the communication signal received through the second antenna ANT2 in uplink communication, and may output the noise-removed communication signal by frequency down-conversion.

The second uplink/downlink switch 316 may switch a moving path of a communication signal according to a second switching signal SW2 generated by the uplink/downlink switch controller 330.

The second uplink/downlink switch 316 may receive a communication signal received through the second antenna ANT2 in uplink communication and may transmit the received communication signal to the uplink processing circuit 320.

The uplink processing circuit 320 may include a second low-noise amplifier 321, a second analog-to-digital converter 322, a second digital filter 323, a second digital-to-analog converter 324, and a second power amplifier 325.

Each component (321 to 325) of the uplink processing circuit 320 may perform signal processing substantially the same as that of each component (311 to 315) of the downlink processing circuit 310 in the reverse direction.

Configurations included in each of the downlink processing circuit 310 and the uplink processing circuit 320 shown in FIG. 2 are merely exemplary configurations, and various modifications may be possible according to embodiments.

The uplink/downlink switch controller 330 may receive the first communication signal SG1 filtered and output from the first digital filter 313 and may generate the switching signals SW1 and SW2 for switching the uplink/downlink switches 305 and 316 based on the input first communication signal SG1.

According to an embodiment, the uplink/downlink switch controller 330 may receive the first communication signal SG1 filtered and output from the first digital filter 313 and a second communication signal SG2 filtered and output from the second digital filter 323, and may generate the switching signals SW1 and SW2 for switching the uplink/downlink switches 305 and 316 based on the input communication signals SG1 and SG2.

According to an embodiment, the uplink/downlink switch controller 330, when initially detecting a TDD switching pattern to generate an uplink/downlink switching signal, may generate the switching signals SW1 and SW2 based on the first communication signal SG1 including both a downlink communication signal and an uplink communication signal, and may use the first communication signal SG1 and the second communication signal SG2 together when correcting and generating the switching signals SW1 and SW2.

According to an embodiment, the uplink/downlink switch controller 330 may receive the first communication signal SG1 and the second communication signal SG2 through a path other than the digital filters 313 and 323. For example, the uplink/downlink switch controller 330 may directly receive a communication signal output from the low-noise amplifiers 311 and 321, a communication signal output from the analog-to-digital converters 312 and 322, or a communication signal in an analog signal state output from the uplink/downlink switches 305 and 316, and may generate the switching signals SW1 and SW2 based on the received communication signal.

Detailed structure and operation of the uplink/downlink switch controller 330 will be described later with reference to FIGS. 3 to 5.

Figure 3:
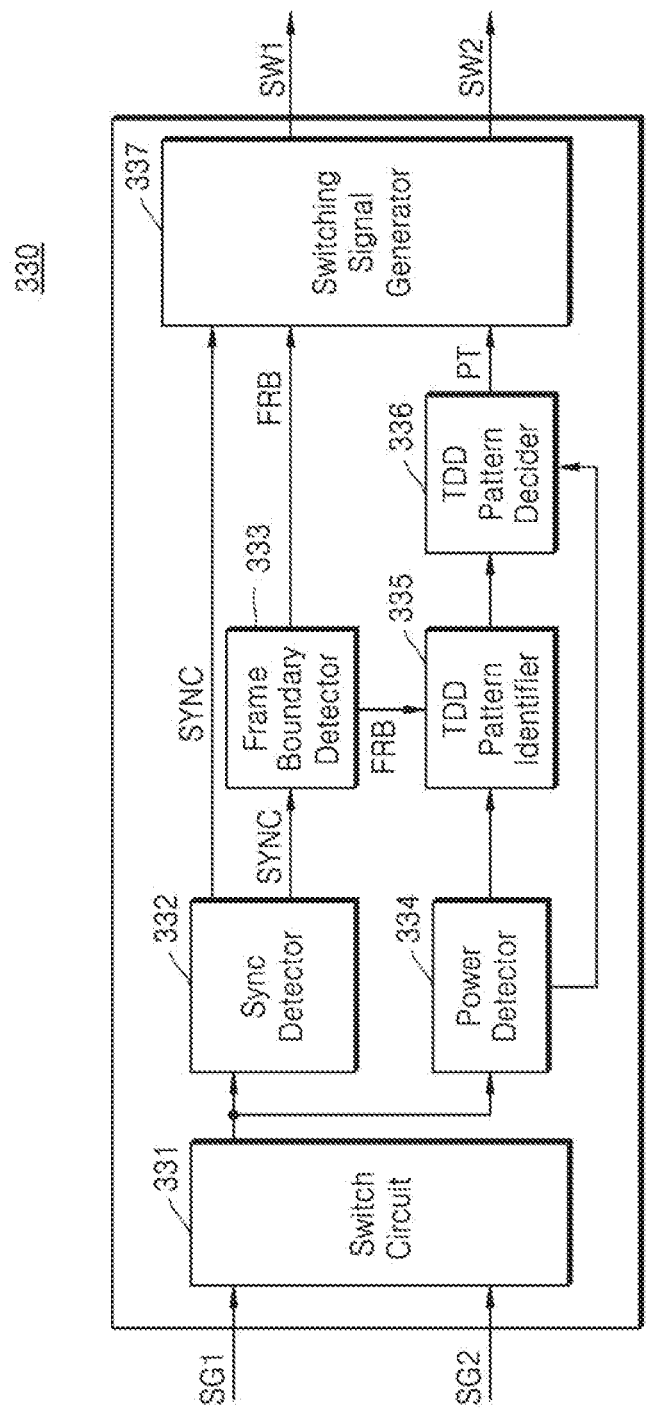
FIG. 3 is a block diagram according to an embodiment of an uplink-downlink switching signal generator shown in FIG. 2.

FIG. 3 is a block diagram according to an embodiment of an uplink-downlink switching signal generator shown in FIG. 2. FIGS. 4 and 5 are views for describing a process for detecting a switching pattern of a communication signal in an uplink/downlink switching signal generator shown in FIG. 3.

Referring to FIGS. 2 to 5, the uplink/downlink switch controller 330 may include a switch circuit 331, a sync detector 332, a frame boundary detector 333, a power detector 334, a TDD pattern identifier 335, a TDD pattern decider 336, and a switching signal generator 337.

The switch circuit 331 may select and output the communication signal SG1 or SG2 to be used for detecting a TDD switching pattern from the input communication signals SG1 and SG2.

The sync detector 331 may detect a sync signal SYNC from the received communication signal SG1.

According to an embodiment, the sync signal SYNC may be a primary synchronization signal (PSS), a secondary synchronization signal (SSS), a synchronization signal (SS)/physical broadcast channel (PBCH), or a demodulation reference signal (DMRS).

The sync detector 331 may output the detected sync signal SYNC to the frame boundary detector 333 and the switching signal generator 337.

The frame boundary detector 333 may detect a frame boundary in a communication signal (e.g., SG1) based on the synchronization signal SYNC detected by the sync detector 331.

According to an embodiment, a symbol position of the sync signal SYNC may be different from a start point of a frame. The frame boundary detector 333 may detect a frame boundary including start point information of the frame by using the synchronization signal SYNC, half-frame information, beam index information, and the like.

According to another embodiment, the frame boundary detector 333 may detect the frame boundary based on a constant correlation between the sync signal SYNC and the frame boundary.

According to another embodiment, the frame boundary detector 333 may detect the frame boundary based on power information of a communication signal of the power detector 334.

The frame boundary detector 333 may output detected frame boundary information FRB to the TDD pattern identifier 335 and the switching signal generator 337.

The power detector 334 may detect a power change of the communication signal over time (e.g., SG1).

According to an embodiment, the power detector 334 may output a time series power value over time of a communication signal (e.g., SG1) synchronized to the frame boundary detected by the frame boundary detector 333.

According to an embodiment, the power detector 334 may detect and output the change in power instantaneously, continuously, or cumulatively.

According to an embodiment, when the first communication signal SG1 and the second communication signal SG2 are used together to detect the TDD switching pattern, the power detector 334 may detect a power change of the received second communication signal SG2 over time and may output the detected power value to the TDD pattern identifier 335.

The TDD pattern identifier 335 may analyze and identify the TDD switching pattern based on the power change over time of the communication signal SG1 or SG2 received from the power detector 334.

According to an embodiment, the TDD pattern identifier 335 may analyze and identify the TDD switching pattern by using the power change over time of the communication signal SG1 or SG2 received from the power detector 334 and the frame boundary information FRB output from the frame boundary detector 333.

According to an embodiment, the TDD switching pattern may include information about the period of the TDD switching pattern and the length of a downlink communication section in the TDD switching pattern.

Figure 4:
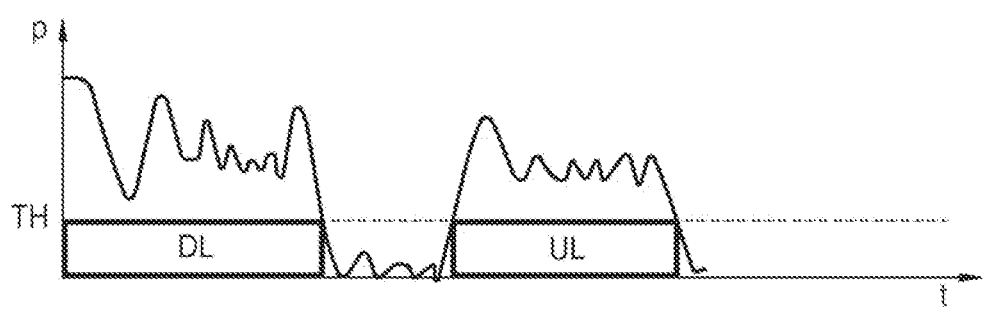
FIGS. 4 and 5 are views for describing a process for detecting a switching pattern of a communication signal in an uplink/downlink switching signal generator shown in FIG. 3.

Referring to FIG. 4 together, the TDD pattern identifier 335 compares a power value of the communication signal SG1 or SG2 with a reference power value TH and determines sections having a power value greater than or equal to the reference power value TH as sections in which a communication signal exists, and may distinguish a downlink communication section DL and an uplink communication section UL according to an order of the determined sections.

The TDD pattern identifier 335 may determine the downlink communication section DL and the uplink communication section UL by using a communication signal converted into a digital signal according to a result of comparing the power value of the communication signal with the reference power value TH.

According to an embodiment, the reference power value TH may be set to a value of 3 dB to 6 dB higher than an effective power value or thermal noise in a section in which the communication signal SG1 or SG2 does not exist, but is not limited thereto.

The TDD pattern identifier 335 may detect the length of the downlink communication section DL.

Figure 5:
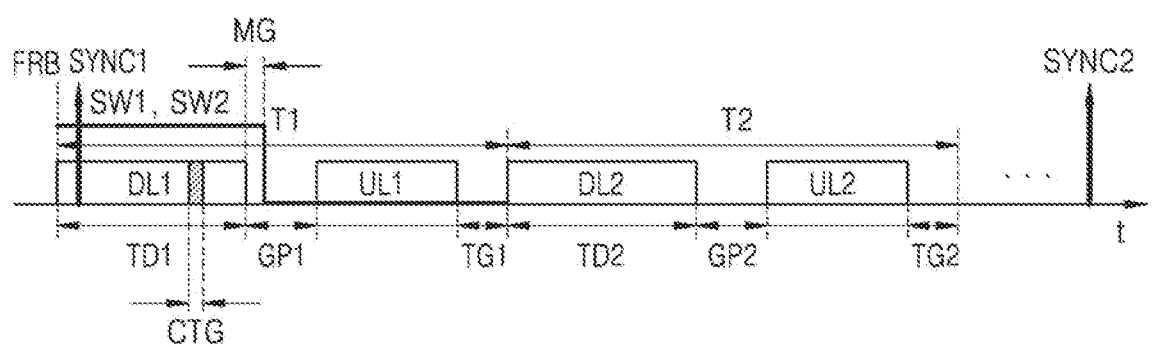

Referring to FIG. 5 together, according to an embodiment, a communication signal received from the repeater 300 may repeat a pattern in an order of downlink communication sections DL1 and DL2, guard periods GP1 and GP2, uplink communication sections UL1 and UL1, and uplink-downlink transition gaps TG1 and TG2.

The TDD pattern identifier 335 may detect a period T1 or T2 in which a pattern including the downlink communication sections DL1 and DL2 and the uplink communication sections UL1 and UL2 is repeated.

According to an embodiment, the TDD pattern identifier 335 may adjust an identification section of a TDD switching pattern or divide and analyze two or more TDD switching patterns to identify the case where the same TDD switching pattern is not repeated and two or more TDD switching patterns are alternately repeated. For example, since a 5G NR rel.15 signal includes two TDD switching patterns that are alternately repeated, and the odd and even periods of the 5G NR rel.15 signal may be distinguished and analyzed.

According to an embodiment, the TDD pattern identifier 335 may detect the period T1 or T2 of the TDD switching pattern using the uplink-downlink transition gaps TG1 and TG2 in the communication signal.

According to an embodiment, the TDD pattern identifier 335, based on a synchronization signal (e.g., SYNC1), may detect a section in which no communication signal is detected between an uplink communication section (e.g., UL1) and a downlink communication section (e.g., DL2) of the next section as an uplink-downlink transition gap (e.g., TG1), and may determine from a frame boundary (e.g., FRB) to the detected uplink-downlink transition gap (e.g., TG1) as a period (e.g., T1) of the TDD switching pattern.

According to an embodiment, the TDD pattern identifier 335 may detect a plurality of downlink communication sections (e.g., DL1 and DL2) included in the communication signal and compare lengths (e.g., TD1 and TD2) of the detected plurality of downlink communication sections (e.g., DL1 and DL2) with each other. The TDD pattern identifier 335, according to a result of the comparing, may determine a length (e.g., TD2) of the longest downlink communication section (e.g., DL2) among the plurality of downlink communication sections (e.g., DL1 and DL2) as the downlink communication section of the TDD switching pattern.

According to an embodiment, only when the sum of an uplink-downlink transition gap (e.g., TG1) and a downlink-uplink transition candidate section (e.g., CTG) corresponds to the length of a symbol corresponding to the size of a guard period (e.g., GP1) or an integer multiple of the length of the symbol, the TDD pattern identifier 335 may identify the TDD switching pattern by determining that data is loaded in the corresponding downlink communication section (or uplink communication section).

According to an embodiment, when the TDD switching pattern is not normally identified according to a power value detected by the power detector 334 (e.g., when the length of a downlink communication section is less than one slot, when the downlink communication section does not start at the frame boundary, etc.), the TDD pattern identifier 335 may identify the TDD switching pattern using a preset uplink-downlink ratio (e.g., 4:1, etc.).

According to an embodiment, the TDD pattern identifier 335 may identify and output one or more candidate TDD switching patterns corresponding to communication signals (e.g., SG1 and SG2).

Returning to FIG. 3, the TDD pattern decider 336 may decide one candidate TDD switching pattern among the one or more candidate TDD switching patterns identified by the TDD pattern identifier 335 as a TDD switching pattern to be used for TDD switching of the repeater 300.

According to an embodiment, the TDD pattern decider 336 may decide a candidate TDD switching pattern including the longest downlink communication section, among a plurality of downlink communication sections of the one or more candidate TDD switching patterns identified by the TDD pattern identifier 335, as the TDD switching pattern to be used for TDD switching of the repeater 300.

According to an embodiment, the TDD pattern decider 336 may further perform a verification process on the decided TDD switching pattern. For example, the TDD pattern decider 336 may verify the decided TDD switching pattern according to whether a signal exists in a certain section outside the boundary of a section determined as a downlink communication section in the communication signals SG1 and SG2. For example, the TDD pattern decider 336 may determine that there is an error in deciding the TDD switching pattern when a signal exists in a certain section outside the boundary of a section determined as a downlink communication section.

According to an embodiment, when determining that there is an error in the TDD switching pattern according to a result of the verification, the TDD pattern decider 336 may perform a verification process by enhancing verification conditions including at least one of a period of a TDD switching pattern to be verified, a length of a downlink communication section to be verified, whether data is loaded in a section determined to be a downlink communication section or an uplink communication section, and a rate at which the decided TDD switching pattern matches a pattern of a communication signal. For example, the enhancement of the verification condition may be performed in the form of increasing the number of verification conditions or raising a verification reference value (e.g., the rate at which the decided TDD switching pattern matches the pattern of the communication signal).

According to an embodiment, as a result of verifying the TDD switching pattern by enhancing the verification conditions, the TDD pattern decider 336 may relax the verification conditions when the verification conditions are satisfied for a reference time. For example, the relaxation of the verification condition may be performed in the form of reducing the number of verification conditions or lowering the verification reference value (e.g., the rate at which the decided TDD switching pattern matches the pattern of the communication signal).

The switching signal generator 337 may generate the switching signals SW1 and SW2 based on the sync signal SYNC output from the sync detector 332 and a TDD switching pattern PT output from the TDD pattern decider 336.

According to an embodiment, the switching signal generator 337 may generate the switching signals SW1 and SW2 based on the sync signal SYNC output from the sync detector 332, the frame boundary information FRB output from the frame boundary detector 333, and the TDD switching pattern PT output from the TDD pattern decider 336.

Referring to FIG. 5 together, the switching signal generator 337 may generate the switching signals SW1 and SW2 based on the sync signal SYNC, a period (e.g., T1) of a TDD switching pattern included in the TDD switching pattern PT, and the length TD1 of the downlink communication section (e.g., DL1).

According to an embodiment, the switching signal generator 337 may generate the switching signals SW1 and SW2 by reflecting a preset margin time MG in the length TD1 of the downlink communication section (e.g., DL1). When the switching signals SW1 and SW2 are in an on state, the uplink/downlink switches 305 and 316 of the repeater 300 may be connected to the downlink processing circuit 310, and when the switching signals SW1 and SW2 are in an off state, the uplink/downlink switches 305 and 316 of the repeater 300 may be connected to the uplink processing circuit 320.

According to an embodiment, the uplink/downlink switch controller 330 may not include the TDD pattern decider 336. In this case, the uplink/downlink switch controller 330 may generate the switching signals SW1 and SW2 by directly using a TDD switching pattern identified by the TDD pattern identifier 335.

FIG. 6 is a flowchart of a method of operating the repeater 300 according to an embodiment.

Referring to FIGS. 1 to 6, in operation S601, the repeater 300 may detect a synchronization signal from a received communication signal.

In operation S602, the repeater 300 may identify one or more candidate TDD switching patterns based on a power change of the received communication signal over time.

According to an embodiment, the repeater 300 may detect the period of the TDD switching pattern and the length of a downlink communication section in the TDD switching pattern based on the power change of the received communication signal over time.

In operation S603, the repeater 300 may decide a TDD switching pattern to be used for switching among the one or more identified candidate TDD switching patterns.

According to an embodiment, the repeater 300 may additionally perform a process of verifying the decided TDD switching pattern. In operation S604, the repeater 300 may switch an uplink operation and a downlink operation of the repeater 300 based on the detected synchronization signal and the TDD switching pattern determined in operation S603.

According to an embodiment, the process of deciding the TDD switching pattern in operation S603 may be omitted. In this case, the repeater 300 may switch the uplink operation and the downlink operation of the repeater 300 by directly using the candidate TDD switching pattern identified in operation S602.

According to an embodiment, the repeater 300 may generate switching signals for switching the uplink/downlink switches 305 and 316 in the repeater 300 based on the detected synchronization signal and the TDD switching pattern.

While the present disclosure has been particularly shown and described with reference to embodiments thereof, it will be understood that various changes in form and details may be made therein without departing from the spirit and scope of the following claims.

The invention claimed is:

1. A method of operating a repeater comprising:
   detecting a synchronization signal from a received communication signal;
   identifying a time division duplex (TDD) switching pattern based on a power change of the communication signal over time; and
   switching an uplink operation and a downlink operation of the repeater based on the detected synchronization signal and the TDD switching pattern,
   wherein the identifying the TDD switching pattern includes:
   identifying each of two or more TDD switching patterns which are alternately repeated; and
   verifying the TDD switching pattern according to whether a signal exists in a certain section outside a boundary of a section determined as a downlink communication section in the communication signal, based on the identified TDD switching pattern.

2. The method of claim 1, wherein the identifying the TDD switching pattern comprises:
   dividing and identifying a first TDD switching pattern corresponding to an odd period and a second TDD switching pattern corresponding to an even period from the communication signal.

3. The method of claim 1, wherein the detecting the synchronization signal from the received communication signal further comprises:
   detecting a frame boundary in the communication signal based on the detected synchronization signal.

4. The method of claim 3, wherein the detecting the frame boundary comprises:
   detecting the frame boundary including start point information of the frame by using the synchronization signal and at least one of half-frame information or beam index information.

5. The method of claim 3, wherein the identifying of the TDD switching pattern comprises:
   identifying the TDD switching pattern on the basis of the power change of the communication signal over time, based on the detected frame boundary.

6. The method of claim 5, wherein the identifying of the TDD switching pattern comprises:
   detecting a period of the TDD switching pattern based on an uplink-downlink transition gap in the communication signal and the detected frame boundary.

7. The method of claim 1, wherein the identifying of the TDD switching pattern further comprises:
   when determining that there is an error in the TDD switching pattern according to a result of verification, verifying the TDD switching pattern by enhancing verification conditions, and
   wherein the verification conditions include at least one of whether data is loaded in a section determined as a downlink communication section or an uplink communication section, or a rate at which the identified TDD switching pattern matches a pattern of the communication signal.

8. The method of claim 1, wherein the identifying of the TDD switching pattern comprises:
identifying one or more candidate TDD switching patterns corresponding to the communication signal based on a period of the TDD switching pattern.

9. A repeater comprising:
a sync detector configured to detect a synchronization signal from a received communication signal;
a TDD pattern identifier configured to identify a time division duplex (TDD) switching pattern based on a power change of the communication signal over time; and
a switching signal generator configured to generate a switching signal for switching an uplink operation and a downlink operation of the repeater based on the detected synchronization signal and the TDD switching pattern,
wherein the TDD pattern identifier is configured to identify each of two or more TDD switching patterns which are alternately repeated, and
wherein the repeater further comprises a TDD pattern decider configured to verify the TDD switching pattern according to whether a signal exists in a certain section outside a boundary of a section determined as a downlink communication section in the communication signal, based on the identified TDD switching pattern.

10. The method of claim 9, wherein the TDD pattern identifier is configured to:
divide and identify a first TDD switching pattern corresponding to an odd period and a second TDD switching pattern corresponding to an even period from the communication signal.

* * * * *